United States Patent
Zhong

(10) Patent No.: US 11,069,326 B2
(45) Date of Patent: Jul. 20, 2021

(54) PROCESSING METHOD FOR CHARACTER STROKE AND RELATED DEVICE

(71) Applicant: SHENZHEN ROYOLE TECHNOLOGIES CO., LTD., Shenzhen (CN)

(72) Inventor: Zhaoyu Zhong, Shenzhen (CN)

(73) Assignee: SHENZHEN ROYOLE TECHNOLOGIES CO., LTD., Shenzhen (CN)

( * ) Notice: Subject to any disclaimer, the term of this patent is extended or adjusted under 35 U.S.C. 154(b) by 62 days.

(21) Appl. No.: 16/480,004

(22) PCT Filed: Dec. 4, 2017

(86) PCT No.: PCT/CN2017/114511
§ 371 (c)(1),
(2) Date: Jul. 23, 2019

(87) PCT Pub. No.: WO2019/109231
PCT Pub. Date: Jun. 13, 2019

(65) Prior Publication Data
US 2019/0371277 A1   Dec. 5, 2019

(51) Int. Cl.
*G06F 3/0488* (2013.01)
*G09G 5/37* (2006.01)
(Continued)

(52) U.S. Cl.
CPC ........... *G09G 5/37* (2013.01); *G06F 3/04883* (2013.01); *G06K 9/00416* (2013.01); *G06T 11/203* (2013.01); *G09G 2354/00* (2013.01)

(58) Field of Classification Search
CPC ......... G09G 5/37; G06F 3/044; G06F 3/0488; G06F 3/04883; G06F 3/03547; G06K 9/00416
See application file for complete search history.

(56) References Cited

U.S. PATENT DOCUMENTS 5,730,602 A * 3/1998 Gierhart ................. G09B 11/00
                                                       345/179
6,044,174 A   3/2000 Sinden
(Continued)

FOREIGN PATENT DOCUMENTS

| CN | 102520849 A | 6/2012 |
| CN | 103257735 A | 8/2013 |
| CN | 103310474 A | 9/2013 |

OTHER PUBLICATIONS

International Search Report dated Feb. 28, 2018, issued in corresponding International Patent Application No. PCT/CN2017/114511, citing the above references.

*Primary Examiner* — Robert J Michaud
(74) *Attorney, Agent, or Firm* — Hauptman Ham, LLP

(57) ABSTRACT

A processing method for character stroke and related device are provided. The method comprises: obtaining handwriting information of a first handwriting point and handwriting information of a second handwriting point in a character stroke, the handwriting information comprising coordinate information; determining a display effect related to the first handwriting point according to the handwriting information of the first handwriting point and the handwriting information of the second handwriting point; rendering the display effect related to the first handwriting point within a display range of the first handwriting point. The display manner of the character stroke can be enriched through above manner, thereby improving the user experience.

19 Claims, 4 Drawing Sheets

(51) Int. Cl.
    *G06K 9/00*       (2006.01)
    *G06T 11/20*    (2006.01)

(56) References Cited

U.S. PATENT DOCUMENTS

2015/0002424 A1*  1/2015  Yamamoto .......... G06F 3/04883
                                                    345/173
2019/0310769 A1* 10/2019  Petkov ................... G06K 9/222

* cited by examiner

Graphic A　　　　　　Graphic B　　　　　　Graphic C　　　　　　Graphic D

Graphic E　　　　　　Graphic F　　　　　　Graphic G　　　　　　Graphic I

PROCESSING METHOD FOR CHARACTER STROKE AND RELATED DEVICE

RELATED APPLICATION

The present application is a National Phase of International Application Number PCT/CN2017/114511, filed Dec. 4, 2017.

TECHNICAL FIELD

The present disclosure relates to a field of writing boards, in particular, to a processing method for character stroke and related device.

BACKGROUND

Currently, with diversification of functions of user terminal, the user terminal can be coupled to various peripheral devices. For example, the user terminal can be coupled to peripheral input devices such as a tablet, a keyboard, a mouse, and the like. Therefore, the user can control the user terminal by operating the peripheral input device, thereby improving the user operation experiences. For example, the user can perform writing operations through a writing board, and the user terminal can display writing handwriting corresponding to the writing operations.

However, the display manner of the character stroke input by the user through the writing board is relatively simple and the user experience is poor.

SUMMARY

Embodiments of the present disclosure provide a processing method for character stroke and a related device, which can enrich display manners of character strokes, thus improving user experiences.

A first aspect of embodiments of the present disclosure provides a processing method for character stroke, and the method may include following steps.

Handwriting information of a first handwriting point and handwriting information of a second handwriting point in a character stroke are obtained; the handwriting information of the first handwriting point and handwriting information of the second handwriting point includes coordinate information.

A display effect related to the first handwriting point is determined according to the handwriting information of the first handwriting point and the handwriting information of the second handwriting point.

The display effect related to the first handwriting point is rendered within a display range of the first handwriting point.

A second aspect of embodiments of the present disclosure provides a processing device for character stroke. The device includes a functional unit for performing a method in the first aspect.

A third aspect of embodiments of the present disclosure provides a user terminal, including a storage and a processor coupled to the storage. Wherein, the storage is configured to execute the computer instructions to perform a method in the first aspect.

A fourth aspect of embodiments of the present disclosure provides a computer readable storage medium storing computer instructions for being executed by a user terminal to perform a method in the first aspect.

In the embodiments of the present disclosure, the display effect related to the first handwriting point may be determined by obtaining the handwriting information of the first handwriting point and the handwriting information of the second handwriting point, and may be rendered within the display range of the first handwriting point. The display manners of the character stroke can be enriched through above manner, thereby improving the user experience.

BRIEF DESCRIPTION OF THE ACCOMPANYING DRAWINGS

DETAILED DESCRIPTION OF ILLUSTRATED EMBODIMENTS

The embodiments of the present disclosure are described below with reference to the accompanying drawings.

Figure 1:
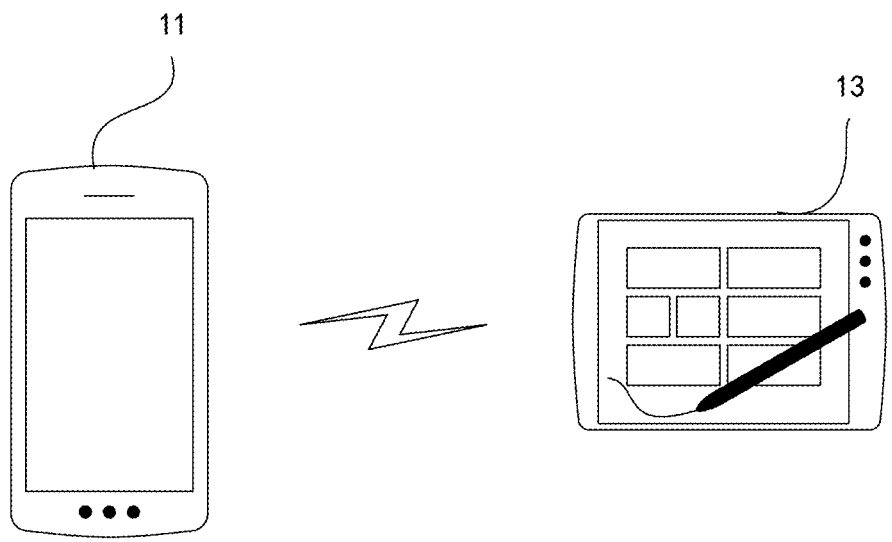
FIG. 1 is a schematic diagram of an application scenario according to one embodiment of the present disclosure.

Referring to FIG. 1, FIG. 1 is a schematic diagram of a scenario in which the following method is applied according to one embodiment of the present disclosure. As shown in FIG. 1, the scenario includes a user terminal 11 and a writing board 13. The user terminal 11 can communicate with the writing board 13. The user terminal 11 and the writing board 13 may be coupled by a wired or wireless way, and are not limited herein.

The user terminal 11 can be equipped with a display screen. For example, the user terminal 11 can be a display device such as a smart phone, a tablet, a virtual reality (VR) device, an augmented reality (AR) device, or a wearable device, and is not limited herein.

The writing board 13 can be configured to detect character strokes of a finger, a writing pen or other writing instrument, and collect handwriting information of handwriting points, for example, coordinate information of the handwriting points or pressure information of the handwriting points, and the like, according to a period. The handwriting information of the handwriting points can be transmitted to the user terminal. The handwriting information of the handwriting points can be processed and displayed by the user terminal. The writing board 13 may be a resistive pressure board, an electromagnetic induction board, or a capacitive touch panel, and is not limited herein.

Referring to the application scenario shown in FIG. 1, an embodiment of a method performed by the user terminal is introduced.

Figure 2:
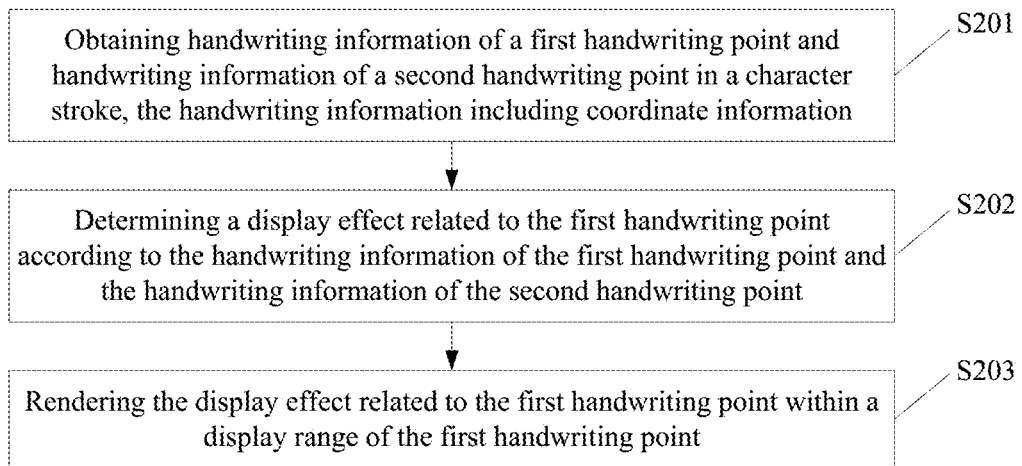
FIG. 2 is a schematic flowchart of a processing method for character stroke according to one embodiment of the present disclosure.

Referring to FIG. 2, FIG. 2 is a schematic flowchart of a processing method for character stroke according to one embodiment of the present disclosure. As shown in FIG. 2, the method at least includes following steps.

At step S201, handwriting information of a first handwriting point and handwriting information of a second handwriting point in a character stroke are obtained; the handwriting information includes coordinate information.

In one embodiment, the writing board can transmit the handwriting information of one handwriting point to the user terminal in real time after obtaining the handwriting point; or, the writing board can collect a complete character stroke and transmit the completed character stroke to the user terminal; or, the writing board can transmit the handwriting information of the handwriting points to the user terminal according to other frequencies, which is not limited herein.

In one embodiment, the user terminal can obtain handwriting information of at least two handwriting points in the character stroke. The user terminal can obtain handwriting information of at least two handwriting points at one time, or handwriting information of one handwriting point at a time, etc., which is not limited herein.

Alternatively, the handwriting information of the handwriting point may include coordinate information, pressure information, and the like of the handwriting point. Furthermore, the handwriting information may further include an instruction of the handwriting point. The instruction is used to indicate whether the handwriting point is a starting handwriting point or a termination handwriting point and the like of the character stroke, which is not limited herein.

At step S202, a display effect related to the first handwriting point is determined according to the handwriting information of the first handwriting point and the handwriting information of the second handwriting point.

In one implementation, a display graphic related to the first handwriting point may be determined according to the coordinate information of the first handwriting point and the coordinate information of the second handwriting.

Specifically, a tangent value of an angle between a line connecting the first handwriting point to the second handwriting point and a horizontal line may be determined according to the coordinate information of the first handwriting point and the coordinate information of the second handwriting point; the display graphic corresponding to the tangent value is determined; and the display graphic is related to the first handwriting point.

For example, it is assumed that the user terminal can obtain the coordinate information (x1, y1) of the first handwriting point, and the coordinate information (x2, y2) of the second handwriting point.

The user terminal can simultaneously obtain handwriting information of the first handwriting point and the second handwriting point, or sequentially obtain handwriting information of the first handwriting point and the second handwriting point. If the user terminal simultaneously obtains the handwriting information of the first handwriting point and the second handwriting point, a sequence for collecting the first handwriting point and the second handwriting point can be determined by the writing board according to the handwriting information. If the user terminal sequentially obtains the handwriting information of the first handwriting point and the second handwriting point, and then, a sequence of collecting the first handwriting point and the second handwriting point can be determined according to an obtaining time, which is not limited herein. The obtaining time of the first handwriting point is assumed to be earlier than the obtaining time of the second handwriting point.

Furthermore, a difference value Δx between the first handwriting point P1 and the second handwriting point P2 based on x-axis, and a difference value Δy between the second handwriting point P2 and the second handwriting point P2 based on y-axis may be respectively determined. Where, Δx=x2−x1, Δy=y2−y1. Furthermore, the tangent value of the angle between the line connecting the first handwriting point to the second handwriting point and the horizontal line may be determined according to Δx and Δy; and the angle between the line connecting the handwriting point P1 to the handwriting point P2 and the horizontal line is determined accordingly. The angle refers to an angle between the line connecting the handwriting point P1 and the handwriting point P2 and the horizontal line, and the angle can be configured to characterize a direction of the handwriting point P1 to the handwriting point P2.

After determining the tangent value of the angle between the line connecting the first handwriting point to the second handwriting point and the horizontal line, the display graphic corresponding to the tangent value can be determined. Where, the display graphic may be a graphic that is fitted by using a third-order Bezier curve, or a graphic that is fitted by other methods, and is not limited herein.

One font may correspond to one or more display graphic. Correspondences between fonts and tangent value ranges can be preset, or, correspondences between display graphics and tangent value ranges can be preset, which are not limited herein. The font may include a regular script, a clerical script, a running script, a black body, a Song typeface, and the like, which is not limited herein. If the font has a correspondence with a tangent value range, and the font corresponds to a plurality of display graphics, one of the plurality of display graphics may be selected according to other conditions. For example, one of the plurality of display graphics is selected according to commonly used input fonts, or the current writing default font, and the like, which is not limited herein.

In the above manner, after the user terminal obtains the tangent value of the angle between the line connecting the first handwriting point to the second handwriting point and the horizontal line, the corresponding font mode may be determined according to the tangent value range in which the tangent value falls.

Alternatively, the display angle may be further determined according to the tangent value of the determined angle. The display angle is matched with the direction of the first handwriting point to the second handwriting point, thereby improving the display effect.

At step S203, the display effect is rendered within a display range of the first handwriting point.

In one embodiment, the display range of the first handwriting point may be determined according to the coordinate information of the first handwriting point, which is not limited herein. The display effect may include a display graphic, a display angle, a display color, a display size, and the like, which are not limited herein.

Alternatively, the display graphic associated with the starting handwriting point may be the same as or different from the display graphic associated with the non-starting handwriting point.

In one implementation, the user terminal may first determine whether the first handwriting point is a starting handwriting point of the character stroke. For example, the user terminal can determine whether the first handwriting point is the starting handwriting point of the character stroke according to the handwriting information of the first handwriting point, or according to the obtaining time of the first handwriting point. If the first handwriting point is determined to be the starting handwriting point, the first display graphic may be obtained, and the first display graphic may be a third-order Bezier curve-fitting graphic, which represents a touch of starting a stroke. Different fonts correspond to different third-order Bezier curve. If the first handwriting point is determined to be a handwriting point other than the starting handwriting point and the termination handwriting point, the second display graphic may be obtained; and the second display graphic may be a second-order Bezier curve-fitting graphic. Where, different fonts correspond to same second-order Bezier curves or different second-order Bezier curves, which are not limited herein.

Alternatively, if the obtaining time of the second handwriting point is later than that of the first handwriting point, the second handwriting point may be further determined whether it is the termination handwriting point of the character stroke. If the second handwriting point is determined to be the termination handwriting point of the character stroke, the display effect related to the second handwriting point can be determined according to the handwriting information of the first handwriting point and the handwriting information of the second handwriting point.

For example, the user terminal may be pre-defined with a display graphic related to the starting handwriting point, and a display graphic related to the termination handwriting point. In an implementation manner, one font may correspond to a plurality of display graphics, wherein one of the plurality of display graphics is related to a starting handwriting point, which is taken as a touch of starting a stroke; another display graphic is related to the termination handwriting point, which is taken as a touch of ending the stroke. Another display graphics is related to the handwriting point in a middle of the stroke, which is not limited herein. The above display graphics may be the same or different, and are not limited herein.

The implementation of determining the display effect related to the second handwriting point can refer to determining the display effect related to the first handwriting point, which will not be described herein. The display effect related to the second handwriting point can be rendered within the display range of the second handwriting point.

In the embodiments of the present disclosure, the display effect related to the first handwriting point can be determined by obtaining the handwriting information of the first handwriting point and the handwriting information of the second handwriting point, and the display effect related to the first handwriting point can be rendered within the display range of the first handwriting point. In the above manner, the display manner of the character stroke can be enriched, thereby improving the user experience.

Figure 3:
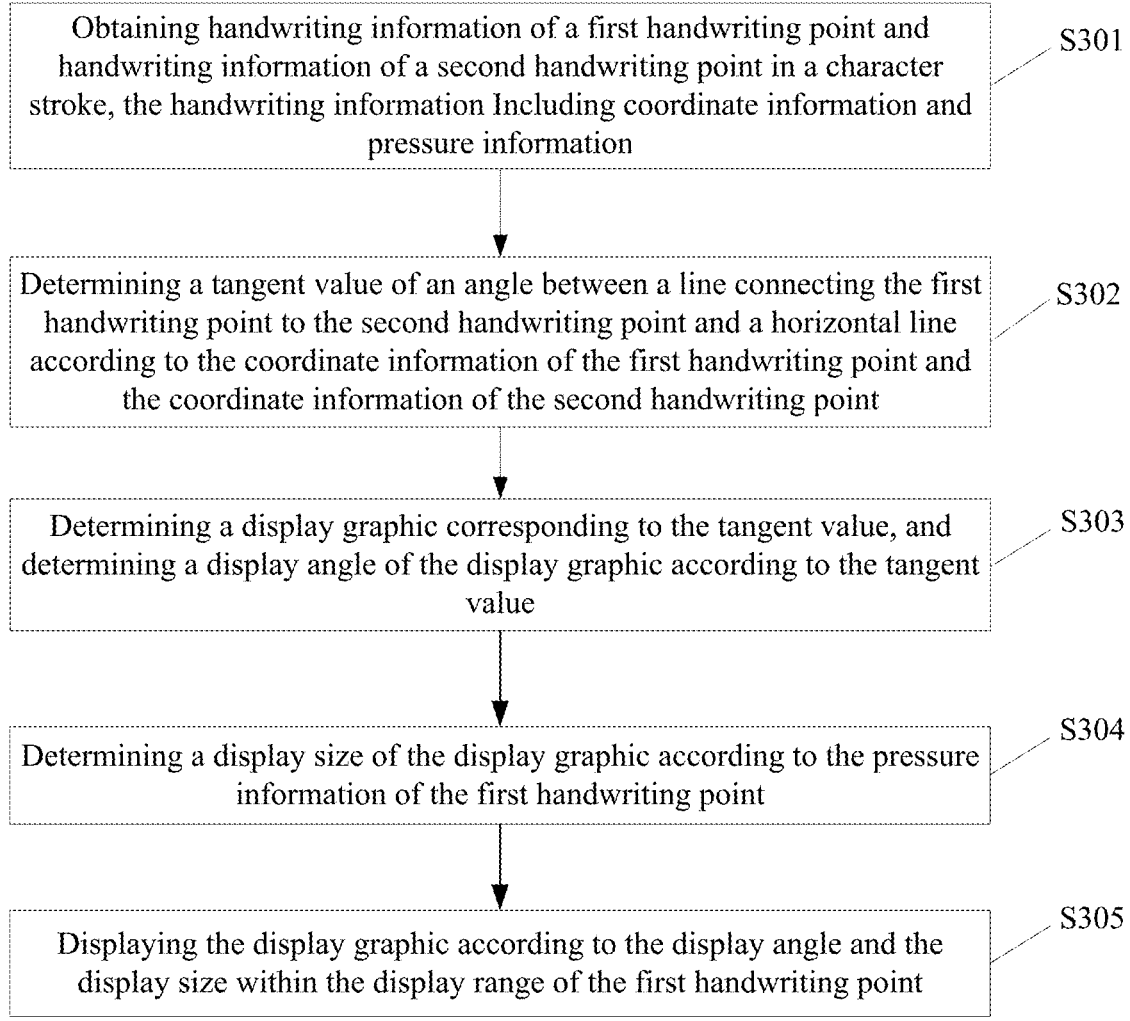
FIG. 3 is a schematic flowchart of another processing method for character stroke according to one embodiment of the present disclosure.

Referring to FIG. 3, FIG. 3 is a schematic flowchart diagram of another processing method for character stroke according to one embodiment of the present disclosure. As shown in FIG. 3, the method at least includes the following steps.

At step S301, handwriting information of a first handwriting point and handwriting information of a second handwriting point in a character stroke are obtained, the handwriting information of the first handwriting point and handwriting information of the second handwriting point includes coordinate information and pressure information.

At step S302, a tangent value of an angle between the line connecting the first handwriting point to the second handwriting point and the horizontal line is determined according to the coordinate information of the first handwriting point and the coordinate information of the second handwriting point.

At step S303, a display graphic corresponding to the tangent value is determined, and a display angle of the display graphic is determined according to the tangent value.

The implementation ways of the steps S301 to S303 refer to the foregoing embodiment, and the details are not described herein.

At step S304, a display size of the display graphic is determined according to the pressure information of the first handwriting point.

In one embodiment, the display size of the display graphic related to the first handwriting point may be also determined according to the pressure information of the first handwriting point.

The display size of the display graphic will be described below with reference to the accompanying drawings.

Figure 4:
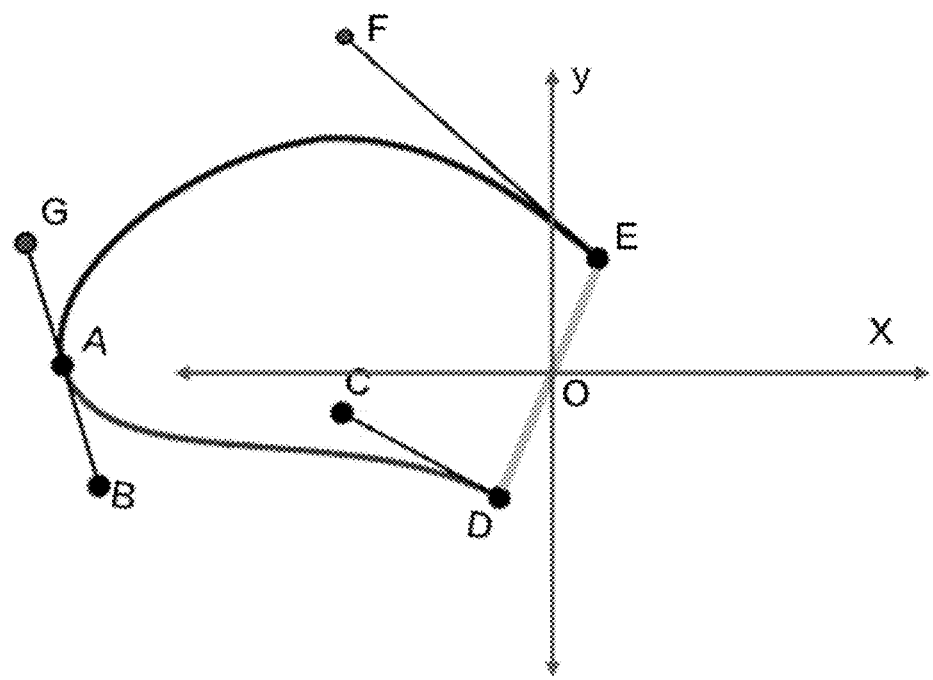
FIG. 4 is a schematic diagram of a display graphic according to one embodiment of the present disclosure.

If the display graphic, which is determined by the above method, related to the first handwriting point is the third-order Bezier curve-fitting graphic, as shown in FIG. 4, the pressure information of the first handwriting point corresponds to a length of a line segment DE, that is, different pressures corresponds to line segments DE with different lengths, the different display sizes of the display graphics are accordingly determined. Specifically, the point O in FIG. 4 is the first handwriting point; the display graphic EADE is the third-order Bezier curve-fitting graphic; the curve AD is determined by the control points A, B, C, and D; and the curve AE is determined by the control points A, G, E, and F. A coordinate axis is created with an O point as an origin. The display angle of the display graphic EADE can be adjusted by the tangent value of the angle of the O point and the second handwriting point. The length of the DE corresponding to the pressure value can be determined by determining the pressure information, such as the pressure value, etc., of the first handwriting point, and the width of the display graphic can be determined accordingly.

In an implementation manner, the user terminal is pre-defined with a third-order Bezier curve-fitting graphic which has a standard angle and a standard size. After obtaining the handwriting information of the first handwriting point and the handwriting information of the second handwriting point, the display angle of the graphic can be determined according to the coordinate information of the first handwriting point and the second handwriting point; and the display width of the graphic can be adjusted according to the pressure information of the first handwriting point; and the display graphic matching with the first handwriting point can be determined accordingly. The display graphic is also rendered in the display area of the O point to enrich the display manner of the character stroke.

Figure 5:
FIG. 5 is a schematic diagram of another display graphic according to one embodiment of the present disclosure.
Figure 5:
Figure 5:
Figure 5:
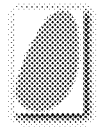
Figure 5:
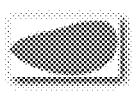
Figure 5:
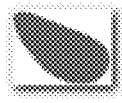
Figure 5:
Figure 5:
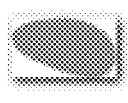

Alternatively, if the display graphic related with the first handwriting point is determined to be a graphic fitted with other ways through above manner, such as, when the display graphic is determined to a predefined conformable graphic, by determining pressure information, such as a pressure value or the like, of the first handwriting point, an overall size of the graphic corresponding to the pressure value can be determined. As shown in FIG. 5, the user terminal can be predefined with conformable graphics corresponding to a plurality of fonts. If the conformable graphic related to the first handwriting point is determined to be graphic A, an overall size of the graphic A can be determined according to the pressure value of the first handwriting point.

In one implementation, the user terminal may be pre-defined with a set of standard sized conformable graphics; the set of conformable graphics have same patterns and different angles. After the user terminal obtains the handwriting information of the first handwriting point and the handwriting information of the second handwriting point, the graphic corresponding to the angle can be selected from the set of graphics according to the coordinate information of the first handwriting point and the second handwriting point; the display size corresponding to the pressure information can be determined according to the pressure information of the first handwriting point; the standard size of the graphic can be adjusted to the display size; and the graphic is displayed, thereby, the graphic is matched with the first handwriting point, enriching the display manner of the character stroke.

In another implementation, the user terminal can be predefined with a conformable graphic with a standard angle and a standard size. The conformable graphic related to the first handwriting point can be determined. The conformable graphic has a standard angle and a standard size. The angle of the conformable graphic can be adjusted according to the coordinate information of the first handwriting point and the second handwriting point. The size of the conformable graphic is adjusted according to the pressure information of the first handwriting point to meet the display size.

Of course, the display angle and the display size of the display graphic may also be determined by other implementation manners, which are not limited herein.

At step S305, the display graphic is displayed according to the display angle and the display size within the display range of the first handwriting point.

In the embodiments of the present disclosure, the display effect can be further improved by the above manner, thereby improving the user experience.

The method described in the embodiments of the present disclosure is exemplified below with reference to FIG. 6.

Figure 6:
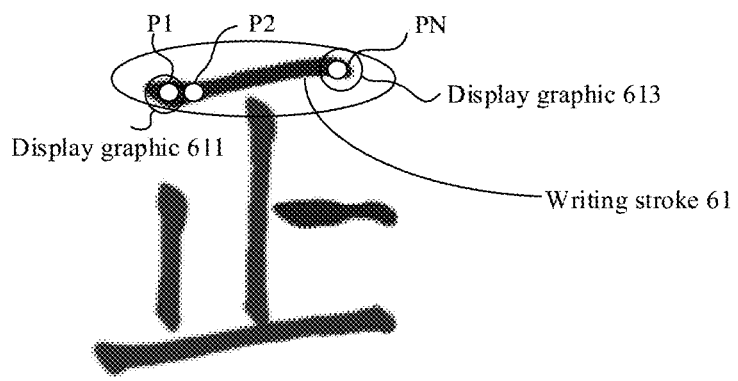
FIG. 6 is a schematic diagram showing a display effect for character stroke according to one embodiment of the present disclosure.

As shown in FIG. 6, the character stroke 61 is taken as an example. The character stroke includes handwriting points P1 to PN. The handwriting point P1 is the starting handwriting point, and the handwriting point P2 is the termination handwriting point.

The user terminal may first obtain handwriting information of the handwriting point P1 and the handwriting point P2, the handwriting information may include coordinate information, and further, may include pressure information.

The user terminal can determine the tangent value of the angle of the handwriting point P1 to the handwriting point P2 according to the coordinate information of the handwriting point P1 and the handwriting point P2, and then determine the display graphic related to the handwriting point P1 according to the tangent value. For example, a certain font corresponding to the tangent value may be determined according to the tangent value, and a starting display graphic corresponding to the font may be determined, and the display graphic is taken as a display graphic related to the handwriting point P1; or, the range of the tangent value range is in one-to-one correspondence with the display graphic. According to the range in which the tangent value falls, the display graphic one-to-one corresponding to the tangent value is taken as the display graphic related to the handwriting point P1, which is not limited herein. The display graphic related to the handwriting point P1 may be a third-order Bezier curve-fitting graphic, and conformable graphics, etc., which is not limited herein.

Secondly, the user terminal can determine the angle of the handwriting point P1 to the handwriting point P2 according to the tangent value; and determine the display angle of the display graphic according to the angle; and determine the display size of the display graphic according to the pressure information of the handwriting point P1, and display the display graphic 611 within the display range of the handwriting point P1 according to the above display angle and the display size. The display graphic 611 can be used as a touch of starting a stroke of the character stroke 61 to make it have a calligraphy effect.

Furthermore, the user terminal can determine the display graphic related to P2 through the above manner, and determine the display angle and display size of the display graphic according to the handwriting information of P2. Due to the handwriting point P2 is a middle handwriting point of the character stroke 61, and its related display graphic may be as same as the display graphic 611 or different from the display graphic 611. For example, if the display graphic 611 is a third-order Bezier curve-fitting graphic, the display graphic related to the middle handwriting point may be a second-order Bezier curve-fitting graphic. For another example, if the display graphic 611 is a conformable graphic, a pattern of the display graphic related to the middle handwriting point may be the same as the display graphic 611; the corresponding display angle and display size can be determined according to the handwriting information of the middle handwriting point. Of course, the display graphic of the middle handwriting point may be other ways, which is not limited herein.

The display way of other middle handwriting points can refer to the display way of handwriting point P2, which is not limited herein.

Furthermore, the user terminal can determine whether the handwriting point PN is the termination handwriting point. If the handwriting point PN is determined to be the termination handwriting point, the display graphic 612 related to handwriting point PN can be determined according to the handwriting point PN and the handwriting information of the handwriting point P (N−1) adjacent to the handwriting point PN. The display angle and display size of the display graphic 612 are further determined. The display graphic 612 may be the same as the display graphic 611 or different from the display graphic 611. Alternatively, the display graphic 612 may be the same as a display graphic related to the middle handwriting point (ie, handwriting point P2), or different from the display graphic related to the middle handwriting point, which not limited herein. In an implementation manner, if the display graphic 611 corresponds to a touch of starting a stroke of a certain font, the display graphic 612 may be determined to be a touch of ending a stroke of the font or the like.

An aesthetics of character stroke 61 can be improved through above manner, thereby improving user experiences.

Figure 7:
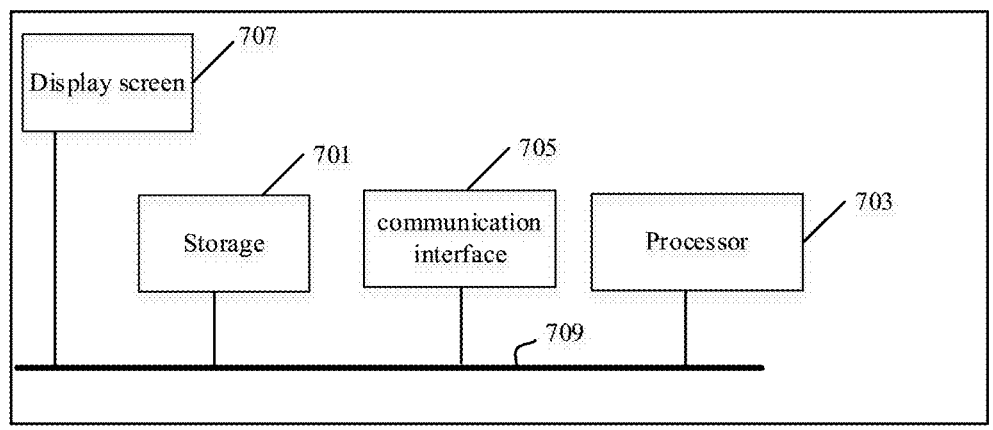
FIG. 7 is a schematic structural diagram of a user terminal according to one embodiment of the present disclosure.

Referring to FIG. 7, FIG. 7 is a schematic structural diagram of a user terminal according to one embodiment of the present disclosure. As shown in FIG. 7, the electronic governor 700 can include a storage 701, a processor 703, a communication interface 705, and a display screen 707. The above devices are coupled through a communication bus.

The storage 701 is used to store applications, computer instructions and data; the processor 703 is used to execute computer instructions and data to execute any of the methods performed by above user terminal; the communication interface 705 is used for signal interaction with the writing board under a control of the processor 703.

The processor 703 may also include a central processing unit (CPU). Alternatively, the processor 703 can also be understood as a controller.

The storage 701 can include a read-only storage and a random access storage, and provides instructions, data, and the like to the processor 703. A portion of the storage 701 may also include a non-volatile random access storage. In particular application, the components are coupled together, for example, through a bus system. In addition to the data bus, the bus system may also include a power bus, a control bus, and a status signal bus. However, for clarity of description, various buses are labeled as bus system 709 in the figure.

The method disclosed in the foregoing embodiment of the present disclosure can be implemented by the processor 703. The processor 703 may be an integrated circuit chip with signal processing capabilities. In the implementation process, each step of the foregoing method may be completed by using an integrated logic circuit of hardware in the processor 703 or an instruction in a form of software. The processor 703 may be a general-purpose processor, a digital signal processor, an application specific integrated circuit, an off-the-shelf programmable gate array or other programmable logic device, a discrete gate or a transistor logic device, or a discrete hardware component. The processor 703 can implement or perform the various methods, steps, and logic blocks disclosed in the embodiments of the present disclosure. The processor 703 may be an image processor, a microprocessor or the processor or any conventional processor or the like. The steps of the method disclosed in the embodiments of the present disclosure may be directly implemented as completion of the hardware decoding processor, or may be performed by using a combination of hardware and software modules in the decoding processor. The software module can be stored in a storage medium that is mature in this field of random storage, flash memory, read-only storage, programmable read-only storage, electrically erasable programmable storage, registers, or the like. The storage medium is located in the storage 701. For example, the processor 703 can read the application, computer instructions or data in the storage 701, and complete the steps of the above method performed by the user terminal in combination with the hardware.

For example, the processor 703 is configured to execute the computer instructions to perform the following methods.

Handwriting information of a first handwriting point and handwriting information of a second handwriting point in a character stroke are obtained; the handwriting information includes coordinate information.

A display effect related to the first handwriting point is determined according to the handwriting information of the first handwriting point and the handwriting information of the second handwriting point.

The display effect related to the first handwriting point is rendered within a display range of the first handwriting point.

Alternatively, the processor is further configured to execute the computer instructions to perform the following methods.

A tangent value of an angle between the line connecting the first handwriting point to the second handwriting point and the horizontal line is determined according to coordinate information of the first handwriting point and coordinate information of the second handwriting point.

A display graphic corresponding to the tangent value is determined, and a display angle of the display graphic is determined according to the tangent value.

The processor also executes the computer instructions to perform the following methods.

The display graphic is displayed according to the display angle within the display range of the first handwriting point.

Alternatively, the handwriting information further includes pressure information, and the processor is further configured to execute the computer instructions to perform the following methods.

A display size of the display graphic is determined according to the pressure information of the first handwriting point.

The display graphic is displayed according to the display angle within the display range of the first handwriting point, including: the display graphic is displayed according to the display angle and the display size within the display range of the first handwriting point.

Alternatively, the processor executes the computer instructions to perform the following methods.

The first handwriting point is determined whether it is the starting handwriting point of the character stroke.

The display graphic corresponding to the tangent value is obtained, including: if the first handwriting point is determined to be the starting handwriting point of the character stroke, a first display graphic corresponding to the tangent value is obtained; if the first handwriting point is determined not to be the starting handwriting point of the character stroke, a second display graphic corresponding to the tangent value is obtained. Where, the first display graphic is different from the second display graphic.

Alternatively, the first display graphic is a third-order Bezier curve graphic, and the second display graphic is a second-order Bezier curve graphic.

Alternatively, the processor executes the computer instructions to perform the following methods.

The second handwriting point is determined whether it is a termination handwriting point of the character stroke.

If the second handwriting point is determined to be the termination handwriting point of the character stroke, a display effect related to the second handwriting point is determined according to the handwriting information of the first handwriting point and the handwriting information of the second handwriting point.

The display effect related to the second handwriting point is rendered within the display range of the second handwriting point.

In the above manner, the display manner of the character stroke can be enriched, thereby improving the user experience.

Figure 8:
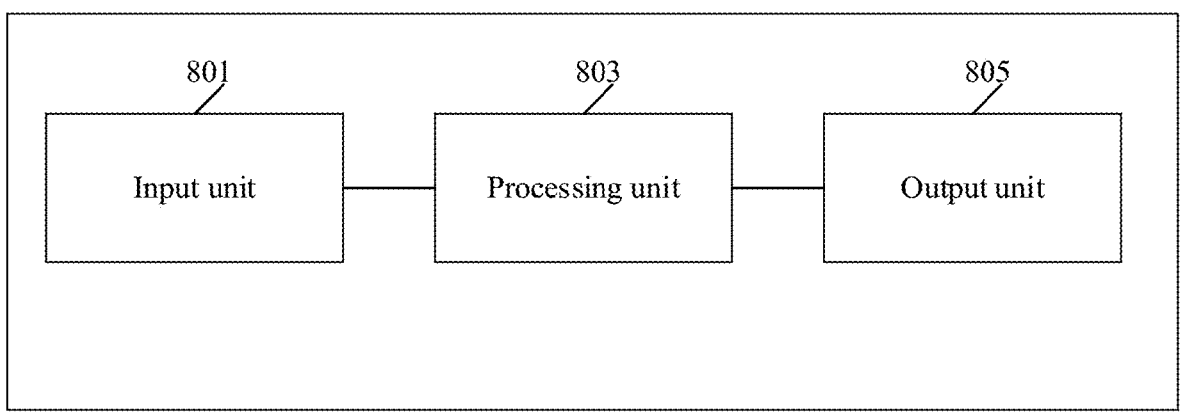
FIG. 8 is a block diagram of a user terminal according to one embodiment of the present disclosure.

Please refer to FIG. 8, FIG. 8 is a block diagram of a processing device of character stroke according to one embodiment of the present disclosure. As shown in FIG. 8, the user terminal may include an input unit 801, a processing unit 803, and an output unit 805.

The input unit 801 is configured to obtain handwriting information of the first handwriting point and the second handwriting point in the character stroke; the handwriting information includes coordinate information.

The processing unit 803 is configured to determine a display effect related to the first handwriting point according to the handwriting information of the first handwriting point and the handwriting information of the second handwriting point.

The output unit 805 is configured to render the display effect related to the first handwriting point within the display range of the first handwriting point.

Alternatively, the processing unit 803 is further configured to determine a tangent value of an angle between the line connecting the first handwriting point to the second handwriting point and the horizontal line according to the coordinate information of the first handwriting point and the coordinate information of the second handwriting point; and determine a display graphic corresponding to the tangent value, and determine a display angle of the display graphic according to the tangent value.

The output unit 805 is further configured to display the display graphic according to the display angle within the display range of the first handwriting point.

Alternatively, the handwriting information further includes pressure information, and the processing unit 803 is further configured to determine a display size of the display graphic according to the pressure information of the first handwriting point.

The output unit 805 is further configured to display the display graphic according to the display angle and the display size within the display range of the first handwriting point.

Alternatively, the processing unit 803 is further configured to determine whether the first handwriting point is the starting handwriting point of the character stroke.

The display graphic corresponding to the tangent value is obtained, including: if the first handwriting point is the starting handwriting point of the character stroke, a first display graphic corresponding to the tangent value is obtained; if the first handwriting point is not the starting handwriting point of the character stroke, a second display graphic corresponding to the tangent value is obtained. Where, the first display graphic is different from the second display graphic.

Alternatively, the first display graphic is a third-order Bezier curve graphic, and the second display graphic is a second-order Bezier curve graphic.

Alternatively, the processing unit 803 is further configured to determine whether the second handwriting point is a termination handwriting point of the character stroke.

If the second handwriting point is the termination handwriting point of the character stroke, a display effect related to the second handwriting point is determined according to the handwriting information of the first handwriting point and the handwriting information of the second handwriting point;

The display effect related to the second handwriting point is rendered within the display range of the second handwriting point.

The above functional unit can be implemented based on the structure of the user terminal shown in FIG. 7, which is not limited herein.

The above is a preferred embodiment of the present disclosure, and it should be noted that those skilled in the art may make some improvements and modifications without departing from the principle of the present disclosure, and these improvements and modifications are also the protection scope of the present disclosure.

What is claimed is:

1. A processing method for character stroke, comprising:
   obtaining handwriting information of a first handwriting point and handwriting information of a second handwriting point in a character stroke of a finger or a writing instrument, the handwriting information of the first handwriting point and the handwriting information of the second handwriting point comprising coordinate information;
   determining a display effect related to the first handwriting point according to the handwriting information of the first handwriting point and the handwriting information of the second handwriting point, wherein the display effect related to the first handwriting point is used to enrich display manners of the character stroke; and
   rendering the display effect related to the first handwriting point within a display range of the first handwriting point.

2. The method according to claim 1, wherein,
   the determining the display effect related to the first handwriting point according to the handwriting information of the first handwriting point and the handwriting information of the second handwriting point comprises:
   determining a tangent value of an angle between a line connecting the first handwriting point to the second handwriting point and a horizontal line according to coordinate information of the first handwriting point and coordinate information of the second handwriting point;
   obtaining a display graphic corresponding to the tangent value, and determining a display angle of the display graphic according to the tangent value, and
   the rendering the display effect within the display range of the first handwriting point, comprises: displaying the display graphic according to the display angle within the display range of the first handwriting point.

3. The method according to claim 2, wherein,
   the handwriting information further comprises pressure information,
   the method further comprises: determining a display size of the display graphic according to the pressure information of the first handwriting point, and
   the displaying the display graphic according to the display angle within the display range of the first handwriting point comprises: displaying the display graphic according to the display angle and the display size within the display range of the first handwriting point.

4. The method according to claim 2, wherein,
   the method further comprises: determining whether the first handwriting point is a starting handwriting point of the character stroke, and
   the obtaining the display graphic corresponding to the tangent value comprises:
   if the first handwriting point is the starting handwriting point of the character stroke, obtaining a first display graphic corresponding to the tangent value; and
   if the first handwriting point is not the starting handwriting point of the character stroke, obtaining a second display graphic corresponding to the tangent value, wherein, the first display graphic is different from the second display graphic.

5. The method according to claim 4, wherein, the first display graphic is a third-order Bezier curve graphic, and the second display graphic is a second-order Bezier curve graphic.

6. The method according to claim 4, wherein, the method further comprises:
   determining whether the second handwriting point is a termination handwriting point of the character stroke;
   if the second handwriting point is the termination handwriting point of the character stroke, determining a display effect related to the second handwriting point according to the handwriting information of the first handwriting point and the handwriting information of the second handwriting point; and
   rendering the display effect related to the second handwriting point within the display range of the second handwriting point.

7. The method according to claim 2, wherein the display graphic corresponds to one selected from multiple preset fonts.

8. A user terminal, comprising:
a storage; and
a processor coupled to the storage,
wherein
the storage is configured to store computer instructions;
the processor is configured to execute the computer instructions for:
  obtaining handwriting information of a first handwriting point and handwriting information of a second handwriting point in a character stroke of a finger or a writing instrument, the handwriting information comprising coordinate information;
  determining a display effect related to the first handwriting point according to the handwriting information of the first handwriting point and the handwriting information of the second handwriting point, wherein the display effect related to the first handwriting point is used to enrich display manners of the character stroke; and
  rendering the display effect related to the first handwriting point within a display range of the first handwriting point.

9. The user terminal according to claim 8, wherein,
the determining the display effect related to the first handwriting point according to the handwriting information of the first handwriting point and the handwriting information of the second handwriting point comprises:
  determining a tangent value of an angle between a line connecting the first handwriting point to the second handwriting point and a horizontal line according to the coordinate information of the first handwriting point and the coordinate information of the second handwriting point;
  obtaining a display graphic corresponding to the tangent value, and determining a display angle of the display graphic according to the tangent value, and
the processor is further configured to execute the computer instructions for: displaying the display graphic according to the display angle within the display range of the first handwriting point.

10. The user terminal according to claim 7, wherein
the handwriting information further comprises pressure information,
the processor is further configured to execute the computer instructions for: determining a display size of the display graphic according to the pressure information of the first handwriting point, and
the displaying the display graphic according to the display angle within the display range of the first handwriting point, comprises: displaying display graphic according to the display angle and the display size within the display range of the first handwriting point.

11. The user terminal according to claim 7, wherein, the processor is further configured to execute the computer instructions for:
  determining whether the first handwriting point is a starting handwriting point of the character stroke; and
  obtaining the display graphic corresponding to the tangent value, comprising:
    if the first handwriting point is the starting handwriting point of the character stroke, obtaining a first display graphic corresponding to the tangent value; and
    if the first handwriting point is not the starting handwriting point of the character stroke, obtaining a second display graphic corresponding to the tangent value, wherein, the first display graphic is different from the second display graphic.

12. The user terminal according to claim 11, wherein the first display graphic is a third-order Bezier curve graphic, and the second display graphic is a second-order Bezier curve graphic.

13. The user terminal according to claim 11, wherein the processor is further configured to execute the computer instructions for:
  determining whether the second handwriting point is a termination handwriting point of the character stroke;
  if the second handwriting point is the termination handwriting point of the character stroke, determining a display effect related to the second handwriting point according to the handwriting information of the first handwriting point and the handwriting information of the second handwriting point; and
  rendering the display effect related to the second handwriting point within the display range of the second handwriting point.

14. A non-transitory computer readable storage medium storing at least one computer program which, when executed by a processor, causes the processor to carry out:
  obtaining handwriting information of a first handwriting point and handwriting information of a second handwriting point in a character stroke of a finger or a writing instrument, the handwriting information of the first handwriting point and the handwriting information of the second handwriting point comprising coordinate information;
  determining a display effect related to the first handwriting point according to the handwriting information of the first handwriting point and the handwriting information of the second handwriting point, wherein the display effect related to the first handwriting point is used to enrich display manners of the character stroke; and
  rendering the display effect related to the first handwriting point within a display range of the first handwriting point.

15. The non-transitory computer readable storage medium according to claim 14, wherein, the determining the display effect related to the first handwriting point according to the handwriting information of the first handwriting point and the handwriting information of the second handwriting point comprises:
  determining a tangent value of an angle between a line connecting the first handwriting point to the second handwriting point and a horizontal line according to coordinate information of the first handwriting point and coordinate information of the second handwriting point;
  obtaining a display graphic corresponding to the tangent value, and determining a display angle of the display graphic according to the tangent value; and
  rendering the display effect within the display range of the first handwriting point, including displaying the display graphic according to the display angle within the display range of the first handwriting point.

16. The non-transitory computer readable storage medium according to claim 15, wherein,
the handwriting information further comprises pressure information,
the at least one computer program which, when executed by the processor, further causes the processor to carry out: determining a display size of the display graphic according to the pressure information of the first handwriting point, and the displaying the display graphic according to the display angle within the display range of the first handwriting point comprises: displaying the display graphic according to the display angle and the display size within the display range of the first handwriting point.

17. The non-transitory computer readable storage medium according to claim 15, wherein, the at least one computer program which, when executed by the processor, further causes the processor to carry out: determining whether the first handwriting point is a starting handwriting point of the character stroke, and the obtaining the display graphic corresponding to the tangent value comprises:

if the first handwriting point is the starting handwriting point of the character stroke, obtaining a first display graphic corresponding to the tangent value; and if the first handwriting point is not the starting handwriting point of the character stroke, obtaining a second display graphic corresponding to the tangent value, wherein, the first display graphic is different from the second display graphic.

18. The non-transitory computer readable storage medium according to claim 17, wherein, the first display graphic is a third-order Bezier curve graphic, and the second display graphic is a second-order Bezier curve graphic.

19. The non-transitory computer readable storage medium according to claim 17, wherein, the at least one computer program which, when executed by the processor, further causes the processor to carry out:

determining whether the second handwriting point is a termination handwriting point of the character stroke;

if the second handwriting point is the termination handwriting point of the character stroke, determining a display effect related to the second handwriting point according to the handwriting information of the first handwriting point and the handwriting information of the second handwriting point; and rendering the display effect related to the second handwriting point within the display range of the second handwriting point.

* * * * *